United States Patent
Martini et al.

(10) Patent No.: US 12,270,472 B2
(45) Date of Patent: Apr. 8, 2025

(54) JOINT, MOTOR, INDUSTRIAL ROBOT AND METHOD OF INSTALLING A SEAL

(71) Applicant: ABB Schweiz AG, Baden (CH)

(72) Inventors: Harald Martini, Gothenburg (SE); Su Zhao, Västerås (SE)

(73) Assignee: ABB Schweiz AG, Baden (CH)

( * ) Notice: Subject to any disclaimer, the term of this patent is extended or adjusted under 35 U.S.C. 154(b) by 169 days.

(21) Appl. No.: 17/593,885

(22) PCT Filed: Mar. 29, 2019

(86) PCT No.: PCT/EP2019/058031
§ 371 (c)(1),
(2) Date: Sep. 27, 2021

(87) PCT Pub. No.: WO2020/200401
PCT Pub. Date: Oct. 8, 2020

(65) Prior Publication Data
US 2022/0170547 A1    Jun. 2, 2022

(51) Int. Cl.
*F16J 15/02*    (2006.01)

(52) U.S. Cl.
CPC .................. *F16J 15/022* (2013.01)

(58) Field of Classification Search
CPC .......... F16J 15/028; F16J 15/02; F16J 15/021; F16J 15/022
See application file for complete search history.

(56) References Cited

U.S. PATENT DOCUMENTS

| 3,103,366 A | * | 9/1963 | Dunn | F16J 15/022 277/625 |
| 3,124,366 A | * | 3/1964 | Hillman | F16J 15/022 277/614 |
| 3,322,433 A | * | 5/1967 | Rentschler | B32B 27/00 525/104 |
| 3,346,266 A | * | 10/1967 | Bondroit | F16J 15/121 277/601 |
| 3,685,123 A | * | 8/1972 | Frisch | F16J 13/02 29/282 |

(Continued)

FOREIGN PATENT DOCUMENTS

| CN | 106065948 A | 11/2016 |
| CN | 107850214 A | 3/2018 |

(Continued)

OTHER PUBLICATIONS

International Preliminary Report on Patentability; Application No. PCT /EP2019/058031; Issued: Sep. 28, 2021; 8 Pages.

(Continued)

*Primary Examiner* — Eugene G Byrd
(74) *Attorney, Agent, or Firm* — Whitmyer IP Group LLC (57) ABSTRACT

A joint including a first member; a second member connected to the first member such that a groove is formed between the first member and the second member; and a hollow seal including a shrinkable material, the seal being shrinked from a static expanded state into the groove by stimulation of the shrinkable material such that the seal seals the groove. A motor and an industrial robot including a joint, and a method of installing a seal, are also provided.

17 Claims, 4 Drawing Sheets

(56) References Cited

U.S. PATENT DOCUMENTS

| | | | | |
|---|---|---|---|---|
| 3,831,954 | A * | 8/1974 | Longfellow | F16L 21/03 285/918 |
| 5,135,239 | A * | 8/1992 | Kato | F16J 15/028 277/648 |
| 5,580,068 | A * | 12/1996 | Gundy | F16J 15/022 277/615 |
| 9,399,301 | B2 * | 7/2016 | Nakanishi | B25J 21/00 |
| 10,359,114 | B2 * | 7/2019 | Seki | F16J 15/441 |
| 10,704,712 | B1 * | 7/2020 | Boulanger | F16L 23/22 |
| 10,857,666 | B2 * | 12/2020 | Procyshyn | B25J 18/04 |
| 2002/0053769 | A1 * | 5/2002 | Oiarbide Aseguinolaza | F16L 17/073 277/602 |
| 2002/0106526 | A1 * | 8/2002 | Kuramoto | F16J 15/022 428/495 |
| 2002/0128692 | A1 | 9/2002 | Imani et al. | |
| 2005/0184468 | A1 | 8/2005 | Aoshiba et al. | |
| 2005/0223536 | A1 * | 10/2005 | Botrie | F16J 15/14 29/527.2 |
| 2005/0272211 | A1 | 12/2005 | Browne et al. | |
| 2014/0001708 | A1 * | 1/2014 | Ewing | B29C 59/16 277/590 |
| 2015/0115535 | A1 * | 4/2015 | Trivedi | F16J 15/46 277/645 |
| 2015/0292665 | A1 | 10/2015 | Strand | |
| 2016/0076650 | A1 * | 3/2016 | Armitage | F16J 15/0887 277/615 |
| 2017/0018984 | A1 * | 1/2017 | Rasinski | H02K 3/51 |
| 2017/0196110 | A1 * | 7/2017 | Shinn | F16J 15/022 |
| 2018/0045311 | A1 * | 2/2018 | Sander | F16J 15/02 |
| 2018/0051634 | A1 * | 2/2018 | Di Florio | F16J 15/021 |
| 2018/0056318 | A1 * | 3/2018 | Jackson | A62C 35/68 |
| 2018/0216737 | A1 * | 8/2018 | Hellholm | B60F 3/003 |
| 2019/0032824 | A1 * | 1/2019 | McNamara | F16J 15/022 |

FOREIGN PATENT DOCUMENTS

| | | | | |
|---|---|---|---|---|
| CN | 109093643 | A | 12/2018 | |
| EP | 1894684 | A1 * | 3/2008 | B25J 19/0075 |
| EP | 3379667 | A1 * | 9/2018 | H02B 13/045 |
| JP | 03244527 | A * | 10/1991 | B29C 61/025 |
| JP | 3083151 | B2 * | 9/2000 | |
| WO | 9628683 | A1 | 9/1996 | |
| WO | 2013156851 | A2 | 10/2013 | |
| WO | 2013156851 | A3 | 1/2014 | |
| WO | 2019137605 | A1 | 7/2019 | |
| WO | WO-2019210954 | A1 * | 11/2019 | F16J 15/3404 |
| WO | WO-2020043276 | A1 * | 3/2020 | B25J 17/00 |

OTHER PUBLICATIONS

THINQK; "FEP Encapsulated Viton O-Rings"; THINQK Pump Parts Technical Bulletin; Aug. 2012; 8 Pages.
International Search Report and Written Opinion of the International Searching Authority; Application No. PCT/EP2019/058031; Completed: Nov. 21, 2019; Mailing Date: Dec. 2, 2019; 10 Pages.
Trelleborg; "Food grade seals" (See "Standard Elastomer Seals"); Trellborg Sealing Solutions; https://www.trelleborg.com/en/seals/your-industry/food-and-beverage/products/; Accessed: Feb. 8, 2019; 5 Pages.
European Office Action; Application No. 19715867.8; Completed Nov. 30, 2023; 5 Pages.
Chinese Office Action, Application No. 2019800947534; Completed: Mar. 14, 2024; Issues: Mar. 15, 2024; 12 Pages.
Chinese Second Office Action; Application No. 2019800947534; Completed Sep. 13, 2024; 17 Pages.

* cited by examiner

JOINT, MOTOR, INDUSTRIAL ROBOT AND METHOD OF INSTALLING A SEAL

TECHNICAL FIELD

The present disclosure generally relates to seals. In particular, a joint comprising a seal, a motor comprising such joint, an industrial robot comprising such joint, and a method of installing a seal, are provided.

BACKGROUND

In processing environments where for example food products, beverages or pharmaceuticals are handled, it is desirable to maintain a high level of hygiene. Comprehensive cleaning procedures are often required for apparatuses, such as industrial robots, operating in such hygienic environments. Typical cleaning procedures include high pressure washing with hot water and the use of strong acidic and alkaline detergents and disinfectants.

Static seals are typically made of various rubber materials which age relatively fast and have much shorter lifetime than, for example, adjacent metal parts. The aging is accelerated by frequent cleaning processes involving high temperatures, high pressures and chemicals.

In order to install a static seal in a groove between two metal parts, the seal may be mated with a face of the first part and the second part may then be connected to the first part (e.g. by screws) to compress the seal. In order to replace the seal, the parts need to be disassembled such that the groove is opened prior to installing a new seal. This process is cumbersome and time consuming, and may for example cause downtime in a production line.

The IP69K standard is an ingress protection rating that defines requirements regarding protection against factors such as dust, high temperatures, high pressures and chemicals. Today, there is no IP69K certified external non-metallic static seal on the market.

US 2015292665 A1 discloses a gasket for sealing of couplings with threads. The gasket is carried out in heat-shrinkable polymer which is shrinked by heat such that it encloses the outer threads on one of the two components that are to be connected.

SUMMARY

One object of the present disclosure is to provide a joint that enables a simple installation and/or replacement of a seal.

A further object of the present disclosure is to provide a joint that enables a fast installation and/or replacement of a seal.

A still further object of the present disclosure is to provide a joint comprising a seal, which joint can withstand harsh wash down conditions.

A still further object of the present disclosure is to provide a joint comprising a seal, which joint is highly hygienic.

A still further object of the present disclosure is to provide a joint comprising a seal, which joint solves several or all of the foregoing objects in combination.

A still further object of the present disclosure is to provide a motor comprising a joint, and which motor solves one, several or all of the foregoing objects.

A still further object of the present disclosure is to provide an industrial robot comprising a joint, which industrial robot solves one, several or all of the foregoing objects.

A still further object of the present disclosure is to provide a simple and/or fast method of installing a seal.

A still further object of the present disclosure is to provide a method of installing a seal, which method solves one, several or all of the foregoing objects.

According to one aspect, there is provided a joint comprising a first member; a second member connected to the first member such that a groove is formed between the first member and the second member; and a hollow seal comprising a shrinkable material, the seal being shrinked from a static expanded state into the groove by stimulation of the shrinkable material such that the seal seals the groove. The seal of the joint thus comprises a shrinkable material configured to shrink by stimulation.

Prior to being shrinked into the groove, the seal can adopt the static expanded state. Once in the static expanded state, the seal can be slid or sleeved over one of the first member and the second member to the groove. When the seal in the static expanded state is aligned with the groove, the seal can be stimulated to shrink into the groove to perform a sealing function in the groove. By means of the seal comprising a shrinkable material, the first member and the second member do not have to be disconnected prior to installing the seal in the groove. Therefore, the joint with the seal according to the present disclosure can be assembled much faster and in a simpler manner.

The seal may provide a hygienic sealing of the groove. The groove may be a circumferential groove, such as a circular groove. The groove may open outwards, e.g. radially outwards. The seal may thus constitute an external seal of the joint. For example, the seal may be exposed to ambient air when seated in the groove.

When the seal seals the groove, the seal may constitute a static seal. When sealing the groove, the seal may be configured to withstand a wash down of the joint. The seal may seal against both liquids and gases and both to and from an exterior environment of the joint.

The seal and the groove may be configured such that the seal expands in an axial direction (e.g. perpendicular to a shrinking direction) as a result of the shrinking force when seated in the groove. The seal can thereby press against the first member and the second member.

A stimulation of the shrinkable material of the seal may alternatively be referred to as an activation or a triggering. The seal may comprise one or several shrinkable materials that respond to an external stimulus by shrinking. In case one or more further materials are employed in the seal, these further materials may be attached to the shrinkable material to follow shrinking of the shrinkable material. In this way, the seal shrinks when the shrinkable material shrinks.

According to one example, each of the first member and the second member is made of metal. Although the first member and the second member do not have to be disconnected prior to installing the seal in the groove, the first member and the second member may be detachably connected to each other.

The shrinkable material may be a shape memory material. The shrinkable material can thereby be configured to shrink or compress into the groove by means of a shape memory effect. In case the shrinkable material is a shape memory material, the stimulation may for example comprise subjecting the shape memory material to heat, an electric field, a magnetic field, light and/or a solution. When the shape memory material is stimulated, the shape memory effect is triggered.

The shape memory material may have a memorized dimension and shape for sealing the groove. The dimension of the seal is thus smaller when the shape memory material adopts the memorized dimension than when the seal adopts the static expanded state. The memorized dimension and shape may substantially correspond to, or correspond to, the dimension and shape of the groove.

The memorized dimension and shape of the shape memory material may be referred to as an original state or permanent state. When the seal adopts the static expanded state, the state of the shape memory material may be referred to as a deformed state or temporary state.

The shrinkable material may be a heat shrinkable material. Alternatively, or in addition, the shrinkable material may be a polymer. Examples of heat shrinkable materials are silicone, FEP (fluorinated ethylene propylene), PFA (perfluoroalkoxy alkanes) and PTFE (polytetrafluoroethylene). In order to make the seal adopt the static expanded state, the heat shrinkable material may be heated, e.g. above a glass transition temperature $T_g$ or above a melting temperature $T_m$, expanded by mechanical force, and rapidly cooled, e.g. to room temperature. In order to shrink the seal comprising the heat shrinkable material, the heat shrinkable material of the seal may be heated, e.g. to a temperature above the glass transition temperature $T_g$ or the melting temperature $T_m$ of the heat shrinkable material.

The shrinkable material may have a shrink ratio of 1.1:1 or higher, such as 1.3:1 or higher, such as 1.5:1 or higher, such as 2:1 or higher. For example, in case the seal is an O-ring comprising the shrinkable material, the internal (or external) diameter of the seal in the static expanded state may be at least 10% larger, such as at least 30% larger, than the internal diameter of the seal when sealing the groove.

The seal may be an annular seal, such as an O-ring or a gasket. Further examples of annular seals are D-rings, square rings and X-rings.

The seal may comprise an exterior material. The exterior material may or may not be shrinkable by stimulation. Examples of exterior materials according to the present disclosure are thermoplastic materials, FEP, PFA and PTFE.

According to one variant, the seal comprises a core of a first material and an encapsulation of a second material at least partly encapsulating the core. The encapsulation material thereby constitutes the exterior material. In this case, the core may for example comprise an elastomer material and the encapsulation material may comprise heat shrinkable FEP or heat shrinkable PFA. The encapsulation may be a coating.

Either one or both of the core and the exterior material may be shrinkable by stimulation. In case only the exterior material is shrinkable by stimulation, the core follows the shrinking of the exterior material. In case only the core is shrinkable by stimulation, the exterior material follows the shrinking of the core. Thus, the exterior material may be fastened to the core. Furthermore, the exterior material may be harder than the core.

According to an alternative variant, the seal comprises only a core and no encapsulation. The material of the core thereby also constitutes the exterior material. In this case, the seal may for example comprise heat shrinkable PTFE.

The exterior material may be configured to withstand a temperature of at least 100° C. Alternatively, or in addition, the exterior material may be configured to withstand a pressure of at least 80 bars, such as at least 100 bars.

According to one variant, the exterior material meets the IEC (International Electrotechnical Commission) standard 60529 and/or the IP69K according to the German standard DIN 40050-9.

The first member and the second member may be rigidly attached to each other, for example by means of one or more fastening elements, such as screws.

The seal according to the present disclosure may be produced by means of additive manufacturing, such as 3D printing. The seal may for example be produced by 3D printing a heat shrinkable polymer.

According to a further aspect, there is provided a motor, such as a motor for an industrial robot, the motor comprising a joint according to the present disclosure.

According to a further aspect, there is provided a conduit comprising a joint according to the present disclosure.

According to a further aspect, there is provided an industrial robot comprising a joint according to the present disclosure.

According to a further aspect, there is provided a method of installing a seal, the method comprising providing a first member and a second member, the second member being connected to the first member such that a groove is formed between the first member and the second member; providing a hollow seal in a static expanded state, the seal comprising a shrinkable material; sliding the seal in the static expanded state over one of the first member and the second member to be aligned with the groove; and stimulating the shrinkable material such that the seal shrinks from the static expanded state into the groove and seals the groove. When the seal is shrinked into the groove, the first member, the second member and the seal constitute a joint according to the present disclosure.

Since the seal is slid over one of the first member and the second member in a static expanded state prior to being shrinked into the groove, the first member and the second member do not have to be disconnected prior to installing the seal in the groove. The method therefore enables a faster and simpler installation or replacement of a seal in the groove. In order to replace the seal in the groove, the seal may be cut open, removed and discarded, and the method may be carried out again with a new seal.

The seal used in the method may be of any type according to the present disclosure. The stimulation may for example comprise subjecting the shape memory material to heat, an electric field, a magnetic field, light and/or a solution. The connection between the first member and the second member may optionally be adjusted after shrinking of the seal into the groove.

The method may further comprise positioning the seal in the static expanded state at least partly in the groove when stimulating the heat shrinkable material such that the seal shrinks into the groove. For example, the seal in the static expanded state may hang in the groove prior to stimulation. Alternatively, the seal in the static expanded state may be held manually by means of a heat resistant tool, or by a robot.

BRIEF DESCRIPTION OF THE DRAWINGS

Further details, advantages and aspects of the present disclosure will become apparent from the following embodiments taken in conjunction with the drawings, wherein:

FIG. 5b: schematically represents a cross-sectional side view of the seal in FIG. 5a;

DETAILED DESCRIPTION

In the following, a joint comprising a seal, a motor comprising such joint, an industrial robot comprising such joint, and a method of installing a seal, will be described. The same reference numerals will be used to denote the same or similar structural features.

Figure 1:
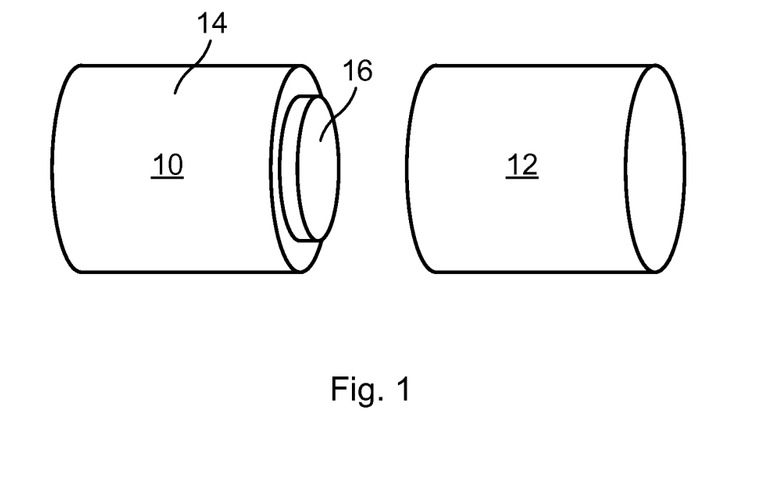
FIG. 1: schematically represents a perspective view of a first member and a second member.

FIG. 1 schematically represents a perspective view of a first member 10 and a second member 12. Each of the first and second members 10, 12 is made of metal and has a generally cylindrical shape. The first member 10 comprises a main body 14 and a protruding part 16 protruding from the main body 14. Also the protruding part 16 is made of metal and has a cylindrical shape. However, the external diameter of the protruding part 16 is smaller than the external diameter of the main body 14. Moreover, the axial length (in the horizontal direction in FIG. 1) of the protruding part 16 is smaller than the axial length of the main body 14.

In wash down/hygienic applications, exposed metal to metal connections, other than welded connections, should be avoided since for example dirt and liquid may collect in such connections. This may deteriorate the hygienic design and increase a risk of corrosion. Therefore, a static seal may be provided in such connections.

Figure 2:
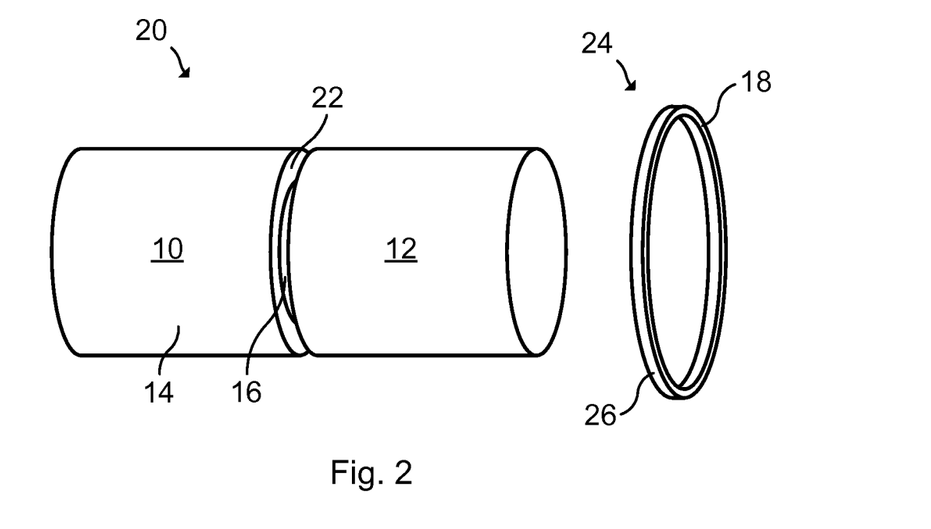
FIG. 2: schematically represents a perspective view of a seal and a joint comprising the first member, the second member and a groove.

FIG. 2 schematically represents a perspective view of a seal 18 and a joint 20 comprising the first and second members 10, 12. In FIG. 2, the first member 10 is connected to the second member 12. The first and second members 10, 12 may for example be rigidly connected by means of screws or other fastening elements. The first and second members 10, 12 may also be arranged to have a relative rotational movement between them.

As shown in FIG. 2, when the first and second members 10, 12 are connected, a groove 22 is formed between the first and second members 10, 12. In this example, the groove 22 is circular and formed around the protruding part 16 between the first member 10 and the second member 12. The groove 22 is thus open radially outwards. The groove 22 is limited by a radially outer surface of the protruding part 16, by the axially outer surface of the main body 14 of the first member 10, and by the axially outer surface of the second member 12. When the first member 10 and the second member 12 are connected, these three surfaces are stationary relative to each other. Thereby, the dimensions of the groove 22 are fixed. The first and second members 10, 12 are thus connected such that the groove 22 is formed between the first and second members 10, 12.

The seal 18 in FIG. 2 is exemplified as a hollow O-ring. The seal 18 comprises a shrinkable material. In FIG. 2, the seal 18 is in a static expanded state 24. Thus, the seal 18 maintains the illustrated shape and dimension unless the shrinkable material of the seal 18 is subjected to an external stimulus.

In the example in FIG. 2, the seal 18 comprises a core (not visible) of a shrinkable material and an exterior material 26 covering the core. The exterior material 26 of this example is a coating of the core.

The shrinkable material of the seal 18 may for example be a shape memory material or a heat shrinkable material. The seal 18 may comprise only one or more such shrinkable materials, or may comprise further additional materials that are less responsive to the stimulation that activates the shrinkable material.

In case the shrinkable material of the seal 18 is a heat shrinkable material, the shrinkable material may be triggered to shrink by exposing the seal 18 to a high temperature, for example a temperature above the glass transition temperature $T_g$ or above a melting temperature $T_m$ of the shrinkable material. In case the shrinkable material of the seal 18 is a shape memory material, the shrinkable material may be triggered to shrink by exposing the seal 18 for example to a stimulation of heat, an electric field, a magnetic field, light and/or a solution. The stimulation of the seal 18 triggers a shape memory effect of the shape memory material. The memorized shape of the shrinkable material is a shape where the seal 18 fits into the groove 22, or slightly smaller such that the seal 18 is compressed into the groove 22. When the heat shrinkable material shrinks, also the seal 18 shrinks. The seal 18 may be produced by means of additive manufacturing, such as by 3D printing.

Figure 3:
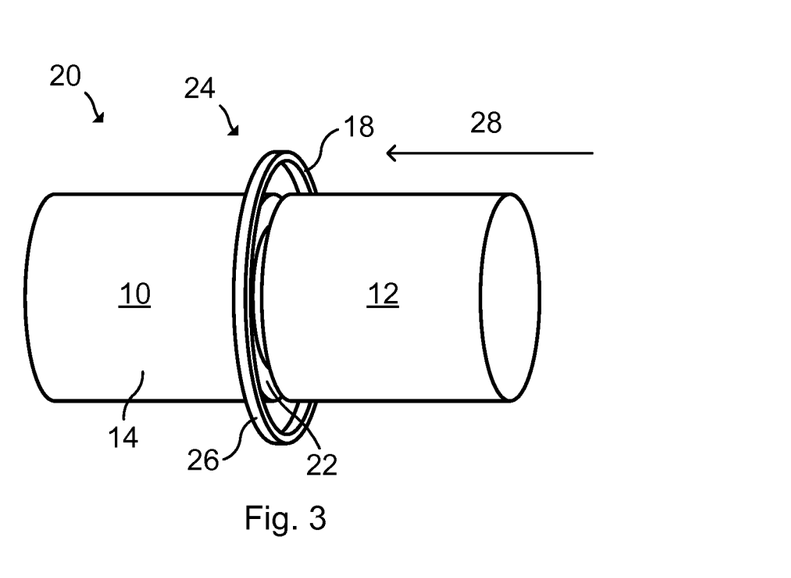
FIG. 3: schematically represents a perspective view of the joint when the seal has been slid over the second member to the groove.

FIG. 3 schematically represents a perspective view of the joint 20. The seal 18 has been slid over the second member 12 to the groove 22, as illustrated by arrow 28. As shown in FIG. 3, the seal 18 in the static expanded state 24 is aligned with the groove 22. During the sliding, the seal 18 is maintained in the static expanded state 24. Thus, in the static expanded state 24, an interior diameter of the seal 18 is larger than the exterior diameters of the first and second members 10, 12. It is however sufficient that the interior diameter of the seal 18 in the static expanded state 24 is larger than one of the diameters of the first and second members 10, 12.

As can be gathered from FIG. 3, the first and second members 10, 12 do not have to be disconnected in order to align the seal 18 with the groove 22. In FIG. 3, the seal 18 is illustrated generally concentric with the groove 22. The seal 18 may for example be held in this position by means of a robot or manually via a tool. Alternatively, the seal 18 in the static expanded state 24 may hang in the groove 22, i.e. such that the uppermost interior surface part of the seal 18 contacts the uppermost surface part of the protruding part 16 in the groove 22.

When the seal 18 is aligned with the groove 22, the seal 18 is stimulated (e.g. by heat or in other ways) such that the shrinkable material shrinks and the seal 18 shrinks into the groove 22.

Figure 4:
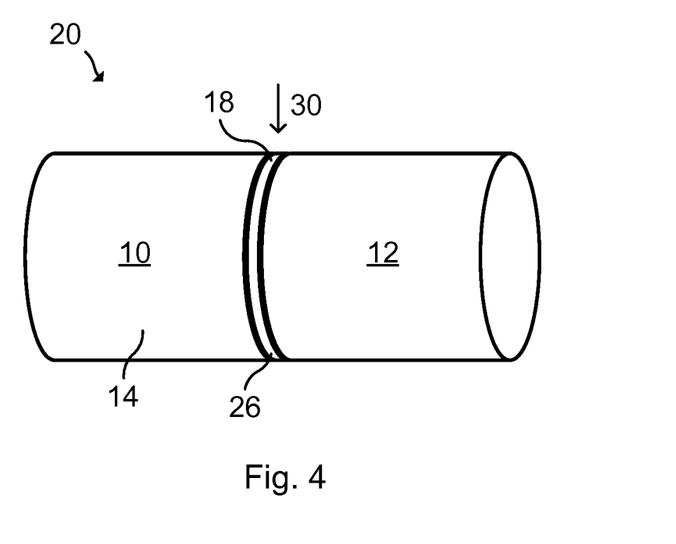
FIG. 4: schematically represents the joint when the seal has been shrinked into the groove.

FIG. 4 schematically represents the joint 20 when the seal 18 has been shrinked into the groove 22, as illustrated by arrow 30. The seal 18 thereby forms a part of the joint 20. In this example, the seal 18 forms an external static seal of the joint 20. In the illustrated shrinked state of the seal 18, the seal 18 seals the groove 22. The seal 18 can thus be arranged to seal the groove 22 between the first and second members 10, 12 in a simple way without having to disconnect the first and second members 10, 12.

The shrink ratio of the seal 18 in this example is approximately 30%. Thus, the interior diameter of the seal 18 in the static expanded state 24 is approximately 30% larger than the interior diameter of the seal 18 when seated in the groove 22.

In the shrinked state of the seal 18 in FIG. 4, the exterior material 26 of the seal 18 is flush with the adjacent exterior surfaces of the first and second members 10, 12. In the shrinked state, the seal 18 may exert a clamping force, i.e. radially inwards against the protruding part 16. This force causes a slight axial expansion of the seal 18 such that the seal 18 also pushes axially or laterally against the faces of the first and second members 10, 12 in the groove 22. For example, in case the shrinkable material is a shape memory material, the memorized shape may be smaller than the groove 22 such that the seal 18 exerts a force when striving to reach this memorized shape.

In FIG. 4, a food grade sealing of the joint 20 that meets the IP69K standard is provided by means of the seal 18. The joint 20 comprising the seal 18 is configured to withstand harsh wash down procedures, involving the use of high pressurized hot water and chemicals. The seal 18 is configured to withstand temperatures of at least 100° C. and pressurized water with a pressure of more than 80 bars.

Should the seal 18 of the joint 20 need to be replaced in the future, the seal 18 can be cut open and discarded. A new seal 18 can be added to the joint 20 according to the method in FIGS. 2 to 4. The first and second members 10, 12 do not have to be disconnected in order to install a new seal 18 in the groove 22.

Figure 5A:
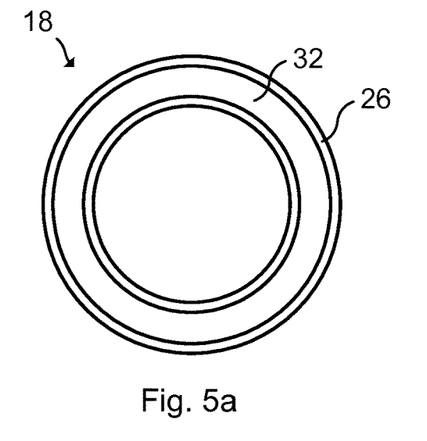
FIG. 5a: schematically represents a cross-sectional axial view of the seal in FIGS. 2 to 4.
Figure 5B:
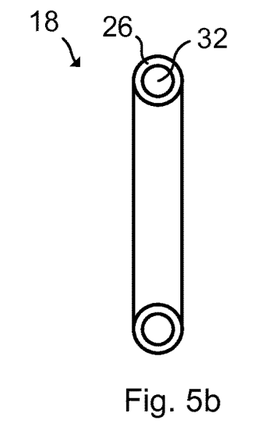

FIG. 5a schematically represents a cross-sectional axial view of the seal 18 in FIGS. 2 to 4. FIG. 5b schematically represents a cross-sectional side view of the seal 18 in FIGS. 2 to 4 and 5a. With collective reference to FIGS. 5a and 5b, the core 32 of the seal 18 can be seen. The core 32 is formed by an inner ring. The core 32 may for example be made of an elastomer. Examples of suitable elastomers are EPDM (ethylene propylene diene methylene), NBR (acrylonitrile butadiene rubber), HNBR (Hydrogenated nitrile butadiene rubber), VMQ (vinyl-methyl-silicone), FKM (a family of fluoroelastomer materials defined by the ASTM International standard D1418) and FFKM (perfluoroelastomers).

In FIGS. 5a and 5b, the core 32 of the seal 18 is entirely covered by the exterior material 26. The core 32 thereby follows the shrinking of the exterior material 26. In this example, the exterior material 26 is a heat shrinkable material. The exterior material 26 may for example comprise FEP, PFA or PTFE. FEP, PFA and PTFE show good resistance against high pressure water treatment at 80° C. and at 100 bars, both before and after ageing. FEP, PFA and PTFE also have high chemical resistance.

Figure 6A:
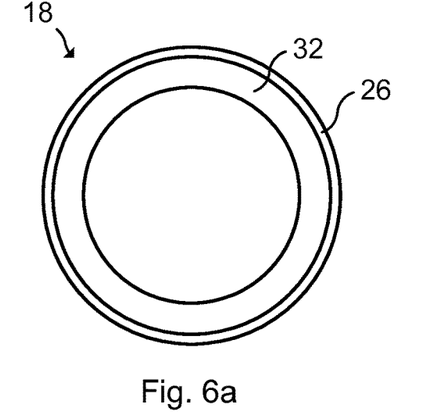
FIG. 6a: schematically represents a cross-sectional axial view of a further example of a seal.
Figure 6B:
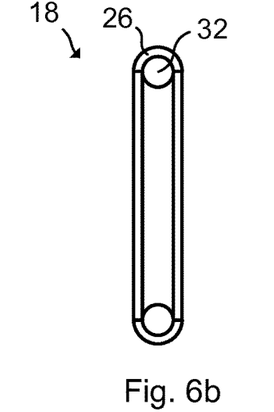
FIG. 6b: schematically represents a cross-sectional side view of the seal in FIG. 6b.

FIG. 6a schematically represents a cross-sectional axial view of a further example of a seal 18. FIG. 6b schematically represents a cross-sectional side view of the seal 18 in FIG. 6a. Mainly differences with respect to FIGS. 5a and 5b will be described. With collective reference to FIGS. 6a and 6b, the exterior material 26 only partly encapsulates the core 32. The exterior material 26 covers the radially outer circumference of the core 32. The exterior material 26 is fastened to the core 32 such that the core 32 follows the shrinking of the exterior material 26.

Figure 7A:
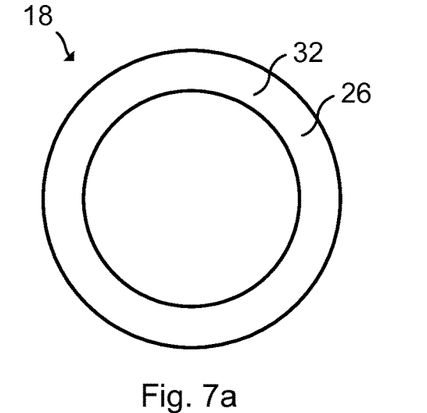
FIG. 7a: schematically represents a cross-sectional axial view of a further example of a seal.
Figure 7B:
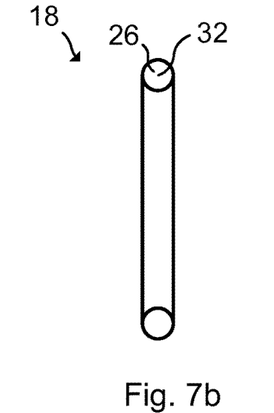
FIG. 7b: schematically represents a cross-sectional side view of the seal in FIG. 7b.

FIG. 7a schematically represents a cross-sectional axial view of a further example of a seal 18. FIG. 7b schematically represents a cross-sectional side view of the seal 18 in FIG. 7a. Mainly differences with respect to FIGS. 5a to 6b will be described. With collective reference to FIGS. 7a and 7b, the seal 18 comprises only one material which thereby constitutes both the core 32 and the exterior material 26 of the seal 18. One example of such material is heat shrinkable PTFE.

Figure 8:
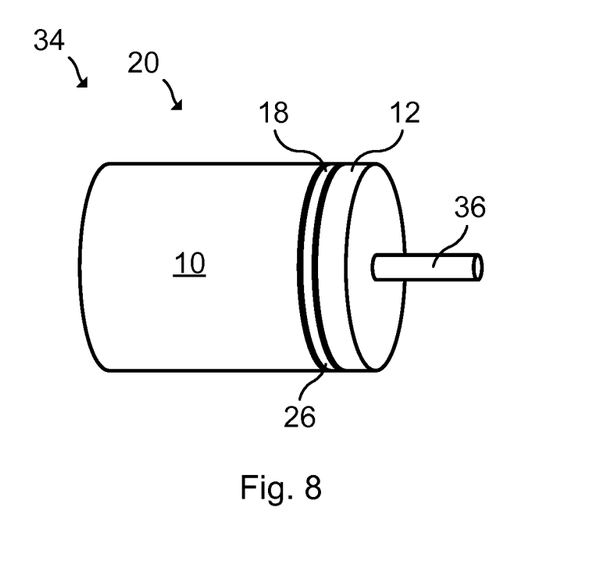
FIG. 8: schematically represents a motor comprising a joint.

FIG. 8 schematically represents a motor 34 comprising a joint 20. One or more motors 34 may for example be provided in an industrial robot. The motor 34 comprises an output shaft 36, a main casing body constituting the first member 10 of the joint 20, and an end cover constituting the second member 12 of the joint 20. The seal 18 can thereby be arranged to seal a groove 22 of a joint 20 in the motor 34 without disassembling the motor 34.

Figure 9:
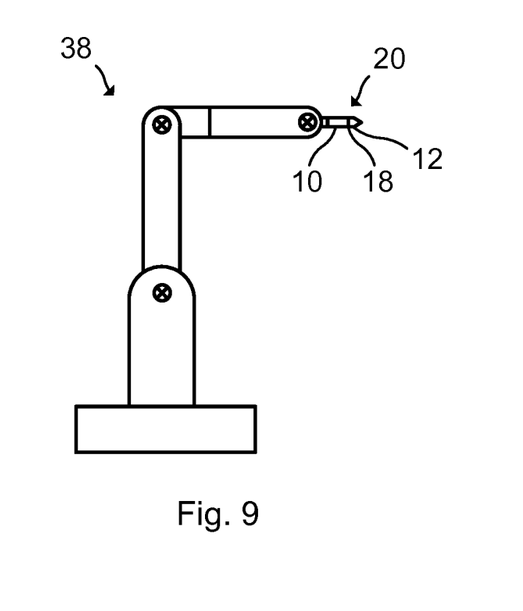
FIG. 9: schematically represents an industrial robot comprising a joint.

FIG. 9 schematically represents an industrial robot 38 comprising a joint 20. In the example in FIG. 9, the first and second members 10, 12 of the joint 20 are constituted by a first and second part of a tool of the robot 38. The seal 18 can thereby be arranged to seal a groove 22 of a joint 20 in the robot 38 without disassembling the robot 38.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of installing a seal, the method comprising:
providing a first member and a second member, the second member being connected to the first member such that a groove is formed between the first member and the second member, wherein the first member includes a main body and a protrusion extending from the main body, the groove being formed around the protrusion between the first member and the second member;
providing a hollow seal in a static expanded state, the seal including a shrinkable material;
sliding the seal in the static expanded state over one of the first member and the second member to be aligned with the groove; and
stimulating the shrinkable material such that the entire seal shrinks into the groove and is then configured in a shrunken state within the groove to seal the groove, the seal thereby axially or laterally pushes against faces of the first and second members in the groove;
wherein the shrinkable material is a shape memory material;
wherein the step of stimulating comprises stimulating the shape memory material such that the seal shrinks to a memorized dimension and shape for sealing the groove;
wherein the memorized dimension of the seal is smaller than an external dimension of the protrusion; and
wherein the step of stimulating includes the seal exerting a radially inward force against the protrusion.

2. The method according to claim 1, wherein the shrinkable material is a heat shrinkable material.

3. The method according to claim 1, wherein the shrinkable material is a polymer.

4. The method according to claim 1, wherein the shrinkable material has a shrink ratio of 1.1:1 or higher.

5. The method according to claim 1, wherein the seal is an annular seal.

6. The method according to claim 1, wherein the seal comprises an exterior material.

7. The method according to claim 6, wherein the exterior material is configured to withstand a temperature of at least 100° C.

8. The method according to claim 6, wherein the exterior material is configured to withstand a pressure of at least 80 bars.

9. The method according to claim 6, wherein the exterior material meets the IEC standard 60529.

10. The method according to claim 1, wherein the first member and the second member are rigidly attached to each other.

11. The method according to claim 1, wherein the step of stimulating comprises shrinking the seal so that the seal is disposed completely within the groove and an exterior side of the seal is flush with adjacent exterior surfaces of the first and second members.

12. A joint comprising:
a first member;
a second member connected to the first member such that a groove is formed between the first member and the second member; and
a hollow seal comprising a shrinkable material, the seal is configured in a shrunken state and disposed entirely within the groove by stimulation of the shrinkable material such that the seal seals the groove and pushes axially or laterally against faces of the first and second members in the groove;
wherein the shrinkable material is a shape memory material;
wherein the first member includes a main body and a protrusion extending from the main body, the protrusion having an external dimension smaller than an external dimension of the main body;
wherein the protrusion of the first member is connected to the second member; and
wherein the groove is formed around the protrusion between the first member and the second member.

13. The joint according to claim 12, wherein the shape memory material has a memorized dimension smaller than the external dimension of the protrusion such that the seal exerts a radially inward force against the protrusion.

14. The joint according to claim 12, wherein the shrinkable material is a polymer.

15. The joint according to claim 12, wherein the shrinkable material has a shrink ratio of 1.1:1 or higher.

16. The joint according to claim 12, wherein the seal is an annular seal.

17. An industrial robot comprising:
a motor having a joint;
the joint having:
a first member;
a second member connected to the first member such that a groove is formed between the first member and the second member; and
a hollow seal comprising a shrinkable material, the seal is configured in a shrunken state and disposed entirely within the groove by stimulation of the shrinkable material such that the seal seals the groove and pushes axially or laterally against faces of the first and second members in the groove;
wherein the shrinkable material is a shape memory material;
wherein the first member includes a main body and a protrusion extending from the main body, the protrusion having an external dimension smaller than an external dimension of the main body;
wherein the protrusion of the first member is connected to the second member; and
wherein the groove is formed around the protrusion between the first member and the second member.

* * * * *